United States Patent Office.

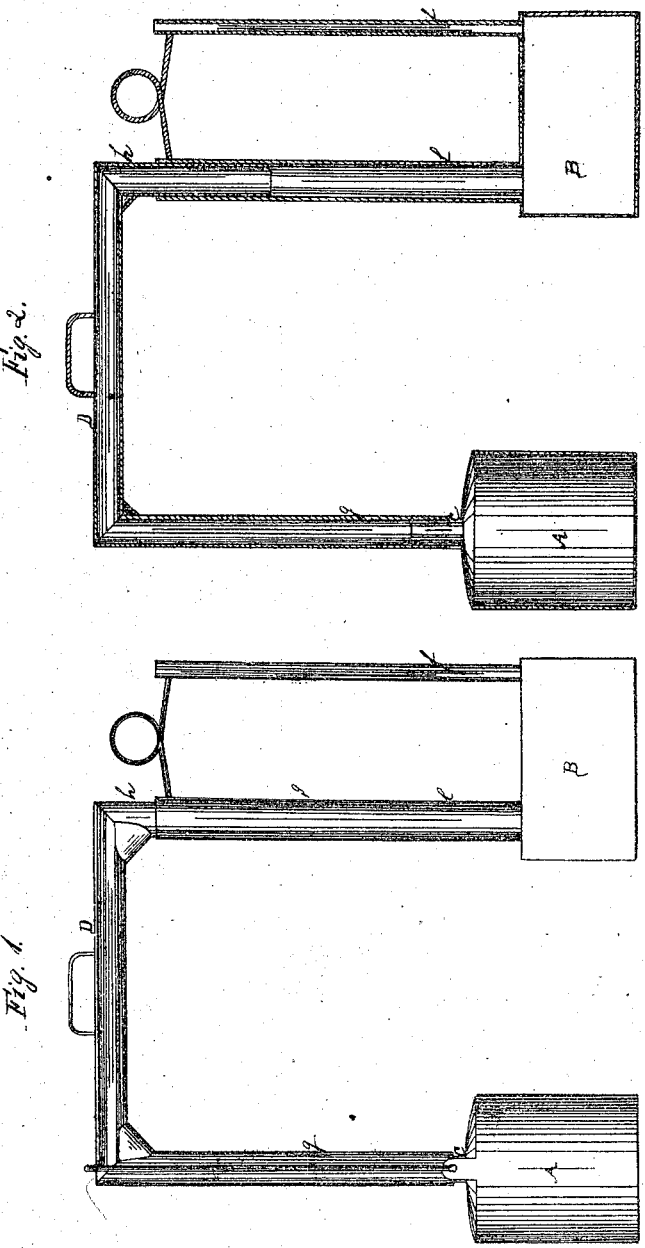

EUGENE T. BROWNFIELD, OF SMITHFIELD, PENNSYLVANIA.

Letters Patent No. 75,622, dated March 17, 1868.

IMPROVEMENT IN APPARATUS FOR TEMPERING CREAM PREPARATORY TO CHURNING.

The Schedule referred to in these Letters Patent and making part of the same.

TO ALL WHOM IT MAY CONCERN:

Be it known that I, EUGENE T. BROWNFIELD, of Smithfield, in the county of Fayette, and State of Pennsylvania, have invented certain new and useful Improvements in Apparatus for Tempering Cream Preparatory to Churning; and I do hereby declare that the following is a full, clear, and exact description thereof, reference being had to the accompanying drawings, and to the letters of reference marked thereon, which form a part of this specification, in which—

Figure 1 represents a side elevation of my invention.

Figure 2 is a central vertical section of the same.

The object of my apparatus is to raise cream or milk to the proper temperature previous to churning.

The letter A designates a boiler, and B the vessel for containing the milk or cream. In the top of vessel B are soldered the two pipes $e$ and $f$, and to the top of boiler B is secured the short pipe $c$. D represents a horizontal tube, to which are soldered at right angles the two tubes $g$ and $h$. The tube $g$, it will be observed, is designed to fit over tube $c$, and tube $h$ inside of tube $e$, thus forming a conduit for the steam from boiler A to vessel B. The pipe $f$ is designed to carry off the partially-condensed steam from vessel B. E represents the bail attached to the pipe $c$, and is used to transfer the boiler A off and on the furnace from which said boiler receives its heat.

In operating my apparatus, the pipe D with its attachment will be removed, and the water and milk will be poured into their respective vessels. The steam generated by the ebullition of the water, will be conducted into vessel B by means of the connected pipes, as above described. When this process is continued sufficiently long to raise the milk to the proper temperature, it will be then poured into the churn. To ascertain the proper temperature, a thermometer may be adjusted to vessel B.

Another plan may be adopted for heating the milk or cream, which is to insert a metallic vessel containing boiling water into the vessel holding the milk or cream, and suffering it to remain until the proper temperature is reached. My apparatus, as above described, is the better mode.

It remains only to observe that during the tempering or souring process, the milk or cream should be constantly agitated, thus allowing it to be more evenly tempered.

Having thus described my invention, what I claim, and desire to secure by Letters Patent, is—

The within-described process for tempering or souring cream or milk, when effected by devices constructed and arranged substantially as set forth.

In testimony that I claim the foregoing as my own, I affix my signature in presence of two witnesses.

EUGENE T. BROWNFIELD.

Witnesses:
   THOMAS WILLIAMS,
   H. B. MATHIOT.